Dec. 31, 1935. W. S. ELLIOT Re. 19,799
GRINDING WHEEL FOR BRISTLES
Original Filed May 28, 1935
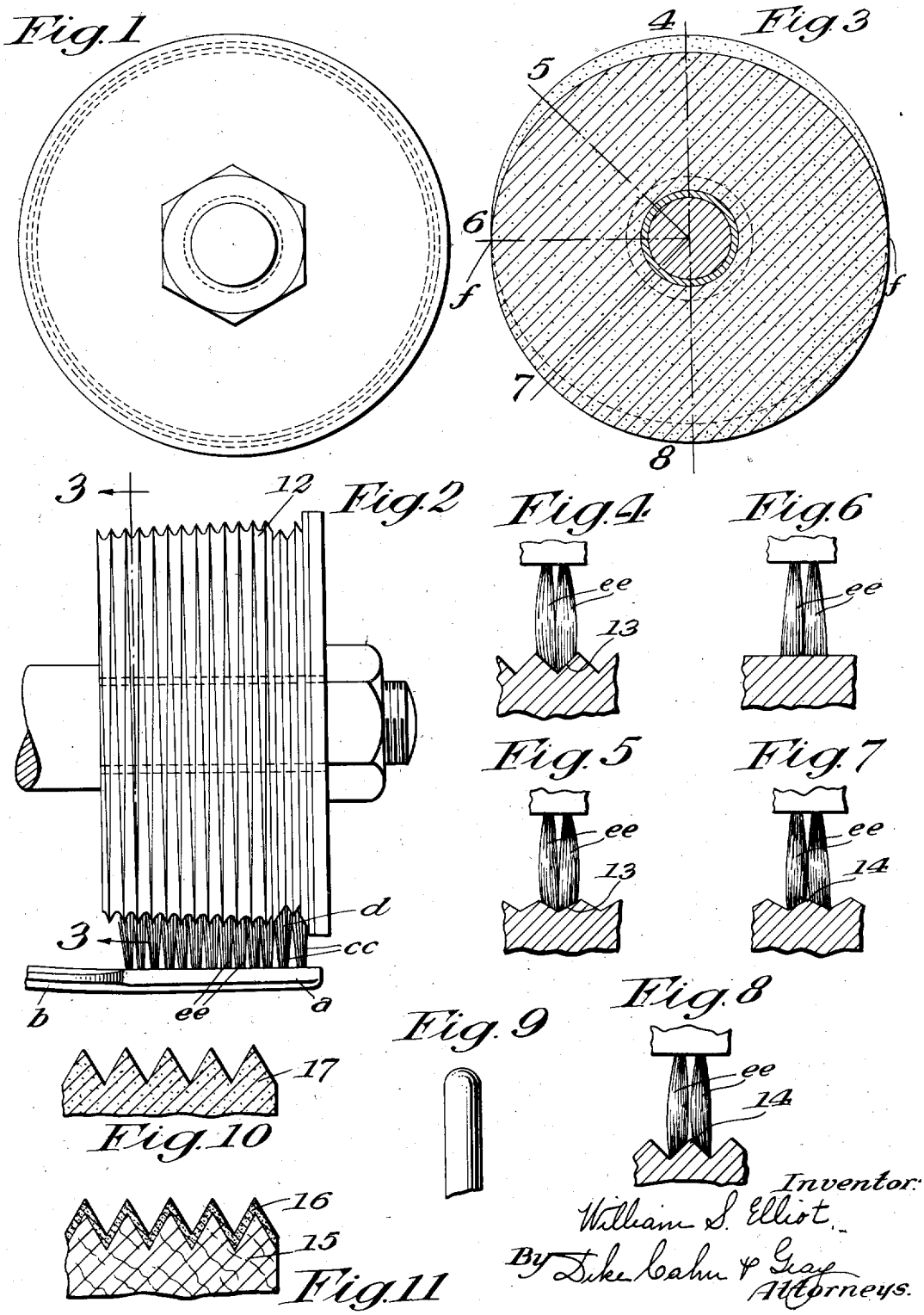
Inventor:
William S. Elliot.
By Dike Calver & Gray
Attorneys.

Reissued Dec. 31, 1935

Re. 19,799

UNITED STATES PATENT OFFICE 19,799

GRINDING WHEEL FOR BRISTLES

William S. Elliot, Northampton, Mass., assignor to Pro-Phy-Lac-Tic Brush Company, Northampton, Mass., a corporation of Delaware Original No. 2,017,487, dated October 15, 1935, Serial No. 23,858, May 28, 1935. Application for reissue November 4, 1935, Serial No. 48,239

1 Claim. (Cl. 51—206)

This invention relates to a grinding wheel for use in grinding the ends of bristles or similar articles so that they will have a rounded shape approaching the hemispherical. It has been found that when bristles in brushes are trimmed to give the brush the proper contour, sharp, jagged edges, splinters and needle like fragments are formed on the ends of the bristles and that these sharp edges, points, and projections are likely to injure the gums, scalp, or skin on which they are used. My invention, therefore, has for its object to provide a device for rounding the ends of the bristles after they have been set in the bristle block or brush head and particularly to provide means which will grind simultaneously all the bristles of a brush which is trimmed to a special contour. I am aware that it has been proposed to make such a grinding wheel of a series of bevelled eccentric discs but my improved device described herein is found to be more satisfactory under certain conditions.

In the accompanying drawing, I have shown a grinding wheel adapted to round the bristles of a brush which is trimmed to the well known tufted shape, i. e. has a group of tufts of bristles at the tip of the bristle body which is longer than the rest of the surface and the remainder of the bristle body is provided with a series of pointed tufts which increase slightly in length toward the handle end of the bristle body.

Fig. 1 is an end view of a grinding wheel embodying my invention.

Fig. 2 is a side elevation of the grinding wheel shown in Fig. 1.

Fig. 3 is a section on line 3—3 looking in the direction of the arrows.

Figs. 4, 5, 6, 7, and 8 are sections taken at points 4, 5, 6, 7, and 8 as indicated in Fig. 3 and showing the successive positions occupied by two tufts of bristles as the grinding wheel revolves.

Fig. 9 is an enlarged view of one end of a bristle which has been ground by a wheel embodying my invention.

Figs. 10 and 11 are longitudinal sections of the grinding wheel shown in Fig. 2 and a modification thereof respectively showing the construction of the grinding surface.

Referring now to Fig. 2 there is shown in elevation the head of a tufted tooth brush, the head being shown at *a*, the portion of the handle at *b*, the knots of bristles *c*, *c* forming the end tuft *d* and the other knots of bristles *e*, *e* forming the remainder of the bristle body of the brush. It will be noticed that these tufts are longer at the handle or heel end of the bristle body and that the bristle body when viewed in side elevation presents a serrated or toothed appearance with a long tuft or tufts at the tip end of the brush.

In making my improved grinding wheel, I find it convenient to divide it into two parts, (1) the portion which grinds the tuft *d* at the tip of the brush being made up of a series of discs in the well known manner, and (2) the portion of the grinding wheel which grinds the remainder of the bristle body. The surface of this blank is provided with a right hand and a left hand spiral groove each having in cross section a contour which varies from the contour of one of the tufts *e* seen in elevation to a flat or substantially flat surface at a distance of 90° from the starting point. Thus if point 4, see Fig. 3, be considered as the starting point, the groove at this point has a contour of a width equal to the pitch of the spiral groove and also equal to the width of one of the serrations *e* of the bristle body. The depth of the groove is equal to the height or depth of the tapering portion of the tuft. This is clearly seen in Fig. 4 where the maximum depth of the groove is illustrated. This groove diminishes in depth until at a distance of 90° the surface becomes flat. This will be readily understood from an examination of Fig. 5 which is a section taken at 45° from Fig. 4, and shows that the groove has diminished to about one-half its original depth and in Fig. 6 which is a section taken at 90° from Fig. 4 and shows that at this point the surface is entirely flat, there being no perceptible groove. After passing the 90° position, the situation is reversed, a groove makes its appearance and increases in depth until the point 8 which is 180° from the starting point is reached. Thereafter the procedure described is repeated during the next 180°.

There is also a left-hand spiral groove 12 which starts at the other end of the conical blank and crosses the right hand groove twice in every revolution of the grinding wheel. This groove like the former alternately increases and diminishes in depth, the bottom of the groove becoming entirely flat when the two opposite 90° positions are reached. The grinding wheel, therefore, has two substantially flat or ungrooved areas *f*, *f* extending longitudinally of the wheel and located 180° from each other. This flat strip is formed by the comparatively flat bottom of the two grooves. Halfway between these two flat areas are areas where the grooves have maximum or substantially maximum depth, these being 180° from each other and 90° from the two flat portions. This arrangement of grooves provides two opposing screw threads of alternately increasing and decreasing depth which have in cross section the contour of the tuft of bristles to be produced with the grinding wheel.

When the trimmed brush body is placed with the ends of its bristles against the grinding wheel, the ends of several serrations fit into the respective grooves. The bristle forming one such serration is shown in Fig. 4 being located in a groove 13. It will be seen that the grinding surfaces of the groove are in contact with the sides of the ends of each of the bristles. The wheel can then be considered as revolving to the position shown in Fig. 5 the tuft being still in the groove 13 but the groove has grown shallower and more of the end portion of each bristle is in contact with the grinding surface of the wheel 13. When the revolution of the wheel is continued to the position shown in Fig. 6 the ends of the bristles rest against the flat area and are being ground on the ends of the bristles rather than on the sides. Further revolution of the wheel brings the ridge 14, see Fig. 7, up under the tufts of bristles dividing them in two parts so that thereafter the sides of the bristles which have previously not been in contact with the wheel now contact with it. As the wheel revolves the groove becomes deeper and the grinding effect is more and more on the side of the bristle.

It will be understood that by this means the grinding proceeds around and around the end of each bristle contacting with the side portion of the bristles in one position and with the extreme ends in another and with the intermediate parts of the bristles in the intermediate positions. The wheel, therefore, accomplishes a simple and effective rounding of the ends of the bristles thereby removing all sharp edges and corners, splinters and needle like portions which might result in injury in use.

In practice I find it convenient to make my grinding wheel with a core or body of some suitable material such as wood or bakelite and apply thereto a thin layer of a suitable abrasive material as, for instance, emery powder secured to the body of the wheel by varnish, glue, shellac or liquid bakelite. In some cases, it is more convenient to form the entire wheel or the major portion of it from abrasive material. In Fig. 11, I have shown a wheel the body of which 15 is bakelite, wood, or fibre and to which is applied an abrasive coating 16. In Fig. 10, I have shown a wheel 17 which is made of solid grinding material.

What I claim is:

A grinding wheel formed of a body on the surface of which are formed right and left hand spiral grooves which cross each other at 180° intervals, said grooves alternately increasing and decreasing in depth through an angle of 180° and forming two flat longitudinal bands 180° apart, separated by two grooved bands whose maximum groove depth is 90° from each of the flat bands.

WILLIAM S. ELLIOT.